United States Patent [19]

Lothamer

[11] E Patent Number: Re. 33,240

[45] Reissued Date of Patent: Jun. 26, 1990

[54] CONTROL APPARATUS AND METHOD

[75] Inventor: David J. Lothamer, Fort Wayne, Ind.

[73] Assignee: Essex Group, Inc., Ft. Wayne, Ind.

[21] Appl. No.: 313,106

[22] Filed: Feb. 21, 1989

Related U.S. Patent Documents

Reissue of:

[64] Patent No.: 4,738,406
Issued: Apr. 19, 1988
Appl. No.: 886,702
Filed: Jul. 18, 1986

[51] Int. Cl.[5] ..... B65H 54/12; B65H 54/32; B65H 55/00

[52] U.S. Cl. ..... 242/16; 242/25 R; 242/158 R; 242/158.2; 242/158.4 R; 242/118.4; 242/159; 242/176

[58] Field of Search ..... 242/16, 17, 25 R, 158 R, 242/158 B, 158 F, 158.2, 158.4 R, 158.4 A, 159, 118.4, 118.6, 170, 174, 176

[56] References Cited

U.S. PATENT DOCUMENTS

| | | | |
|---|---|---|---|
| 2,254,221 | 9/1941 | Hubbard | 242/25 R |
| 2,709,553 | 5/1955 | Wellcome | 242/176 X |
| 2,900,145 | 8/1959 | Hanson | 242/158.2 |
| 3,000,493 | 9/1961 | Hirst | 242/170 |
| 3,170,650 | 2/1965 | Bauer | 242/25 R |
| 3,413,834 | 12/1968 | Kovaleski | 242/25 R X |
| 3,433,434 | 3/1969 | Latter | 242/158 R |
| 4,022,391 | 5/1977 | Stein et al. | 242/25 R |
| 4,130,249 | 12/1978 | Steinhilber | 242/25 R |
| 4,130,256 | 12/1978 | Hosbein | 242/118.6 X |
| 4,244,539 | 1/1981 | Taneda et al. | 242/158 R |
| 4,283,020 | 8/1981 | Bauer et al. | 242/25 R |
| 4,485,978 | 12/1984 | O'Connor | 242/25 R |
| 4,623,100 | 11/1986 | Tremblay | 242/25 R |
| 4,629,145 | 12/1986 | Graham | 242/25 R X |

*Primary Examiner*—Stanley N. Gilreath
*Attorney, Agent, or Firm*—Allegretti & Witcoff, Ltd.

[57] ABSTRACT

A method and apparatus is disclosed for winding an advancing strand onto a spool having a barrel and a pair of end flanges utilizing a strand traverse guide reciprocated relative to the spool at a linear speed proportional to the relative rotational velocity of the spool. The spool may have flat end pieces or tapered ends. The barrel of the spool may be cylindrical or tapered. The end limits of reciprocation of the strand guide are established in relation to the spool base and are determined based on the rotational speed of the spool, the linear speed of the strand and the known geometry of the spool.

12 Claims, 3 Drawing Sheets

CONTROL APPARATUS AND METHOD

Matter enclosed in heavy brackets [ ] appears in the original patent but forms no part of this reissue specification; matter printed in italics indicates the additions made by reissue.

DESCRIPTION

1. Technical Field

This invention relates to a method and apparatus for controlling the winding of wire or any other strand-like or filamentary material onto spools having a wide variety of shapes and more particularly relates to a method and apparatus for winding an advancing strand onto a spool having end flanges of any shape including tapered, and a cylindrical or tapered barrel.

2. Background Art

In the winding of wire or any other strand-like or filamentary material onto a rotating spool it is well known to guide the strand onto the spool with a reciprocating wire traverse guide which moves with strokes of increasing length as wire builds up on the spool. It is also known to wind strand onto a spool using an apparatus which employs a strand guide flyer mounted for rotary movement around a spool.

Each of these types of machines have been designed for winding wire onto spools with tapered flanges. Thus, they must include means for increasingly widening the limits of traversing movements, in response to build-up of wire on the spools, since successive layers become wider with such tapered flanges.

In the apparatus of U.S. Pat. No. 2,254,221, the distance of traverse movement is controlled with a switch actuating lever which, upon physical engagement with the spool end flanges, effects a reversal of the traverse device.

The traverse reversing mechanism of U.S. Pat. No. 3,170,650 is controlled by a follower roller arranged to engage wire wound on the spool to effect an increase in the distance of traverse movement in response to build-up of wire on the spool.

In the apparatus of U.S. Pat. No. 3,413,834, the reversal points of the traverse guide are controlled by a timer which is effective to incrementally increase the movement limits of the traverse guide after a fixed period of time corresponding to a select number of traverse movements.

A counter is employed in the apparatus of U.S. Pat. No. 4,130,249 for counting the revolutions of the spool and for reversing the direction of movement of the wire traverse guide when the count reaches a predetermined number which is incrementally increased a given amount each time the movement of the traverse guide undergoes a given number of reversals.

Prior art wire winding machines of the types described above are generally of a highly complex nature, requiring substantial set-up times for adjusting and changing stops, limit switches, pinions, or the like for each different size of wire or for winding the same size wire on different sizes of spool. Although the apparatus of U.S. Pat. No. 4,130,249 is of less complexity, it suffers from the disadvantage that it does not automatically compensate for variations in the size of the wire or other parameters affecting fill of the wire on the spool, such as wire tension, turns per inch, or different wire lubricities, all of which can affect the apparent density of the wire on a spool.

In the apparatus of U.S. Pat. No. 4,485,978, the motion of the strand guide is reversed when the number of turns counted, from the flange apex of an out-turned conical flange (frustrum), reaches a value substantially equal to the quotient of a sensed length value divided by a predetermined reference value, which represents the length of a single turn of strand wound on the bare spool barrel. This apparatus suffers from the disadvantage that it is limited to spools having cylindrical barrels. In the manufacture of wire and other strand products, however, it is often advantageous to wind wire and the like onto spools having tapered barrels so that slackened wire does not fall and become entangled.

A need exists for a winding machine which winds wire or other filamentary or strand-like material onto a spool having a tapered barrel with flanges of any type including flat or tapered. This winding machine should not be of a complex nature requiring substantial set-up times for adjusting and changing stops, limit switches, pinions or the like for each different size of strand-like material or wire or for winding such material on different sizes of spools. It must automatically compensate for variations in the size of the strand or other parameters affecting fill of the strand on the spool, such as strand tension, turns per inch, or different strand lubricities.

DISCLOSURE OF THE INVENTION

The object of the present invention is to provide a method and apparatus for controlling the winding of a strand onto a spool having a cylindrical or tapered barrel by providing reversal signals for a traverse mechanism which guides wire in layers onto the barrel.

In accordance with the present invention, an advancing strand of wire or filamentary material is monitored and an advance signal indicative of the advance in time of the strand is provided along with a spool signal indicative of the present rotation rate of a spool having the advancing strand helically wound in successive layers thereon; the advance signal and spool signal are provided to a signal processor which compares the magnitudes thereof and determines, from a relationship which may be solved according to the result of the comparison, the present points of intersection with the spool's ends of a line parallel to the surface of the spool's barrel and indicative of the present position or depth of the topmost layer of the strand on the spool's barrel. The points of intersection correspond to reversal points for a mechanism for guiding the strand repeatedly back and forth from end-to-end of the spool to form successive helical layers on the spool's barrel. The signal processor provides forward and reverse switching signals to the mechanism corresponding to the present points of intersection.

In further accord with the present invention, the spool may have one tapered end flange and the layers are therefore, in such a case, successively wider. Of course, the spool may have two tapered ends. Or, the spool may have one or more flat end pieces.

In still further accord with the present invention, the barrel of the spool may be tapered.

In still further accord with the present invention, the reversal points are referenced to a single reference point.

In still further accord with the present invention, the slope of the line is taken with respect to a Cartesian coordinate system having its y-axis coincident with the axis of rotation of the spool. The slope is predetermined according to the geometry of the barrel of the particular type of spool being wound. The position of the line, as expressed by the known slope and the present value of its y-intercept, is determined by comparing the magnitude of a spool signal indicative of the period of revolution of the spool to the magnitude of an advance signal indicative of the period of revolution of a wheel or capstan in contact with the strand.

Each of the end flanges can be described by the equation of a line along the surface of the flange, intersecting the y-axis and in the same plane defined by the line parallel to the barrel and the y-axis. Each of the equations defining the surface of an end flange may be solved simultaneously with the equation of the line parallel to the barrel so as to obtain the point of intersection of the line with the flange.

The present apparatus and method is used for determining the reversal points for a strand traverse guide relative to a spool having end flanges at the end of a cylindrical or tapered shaped barrel at a speed proportional to the relative rotational velocity of the spool. The particular method and apparatus disclosed herein utilizes a strand guide mechanism which guides strands relative to the rotational speed of the spool rather than to the speed of the strand in order not to cause a change in the strand slope as the spool fills.

Thus, the present invention satisfies the need for a winding machine which winds wire or other filamentary or strand-like material onto a spool having either a cylindrical or tapered barrel with flanges of any type including flat or tapered. The apparatus and method is very simple, requiring no substantial set-up times for adjusting and changing stops, limit switches, pinions or the like for each different size of strand-like material or wire or for winding such material on different sizes of spools. It automatically compensates for variations in the size of the strand or other parameters affecting fill of the strand on the spool, such as strand tension, turns per inch, or different strand lubricities.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
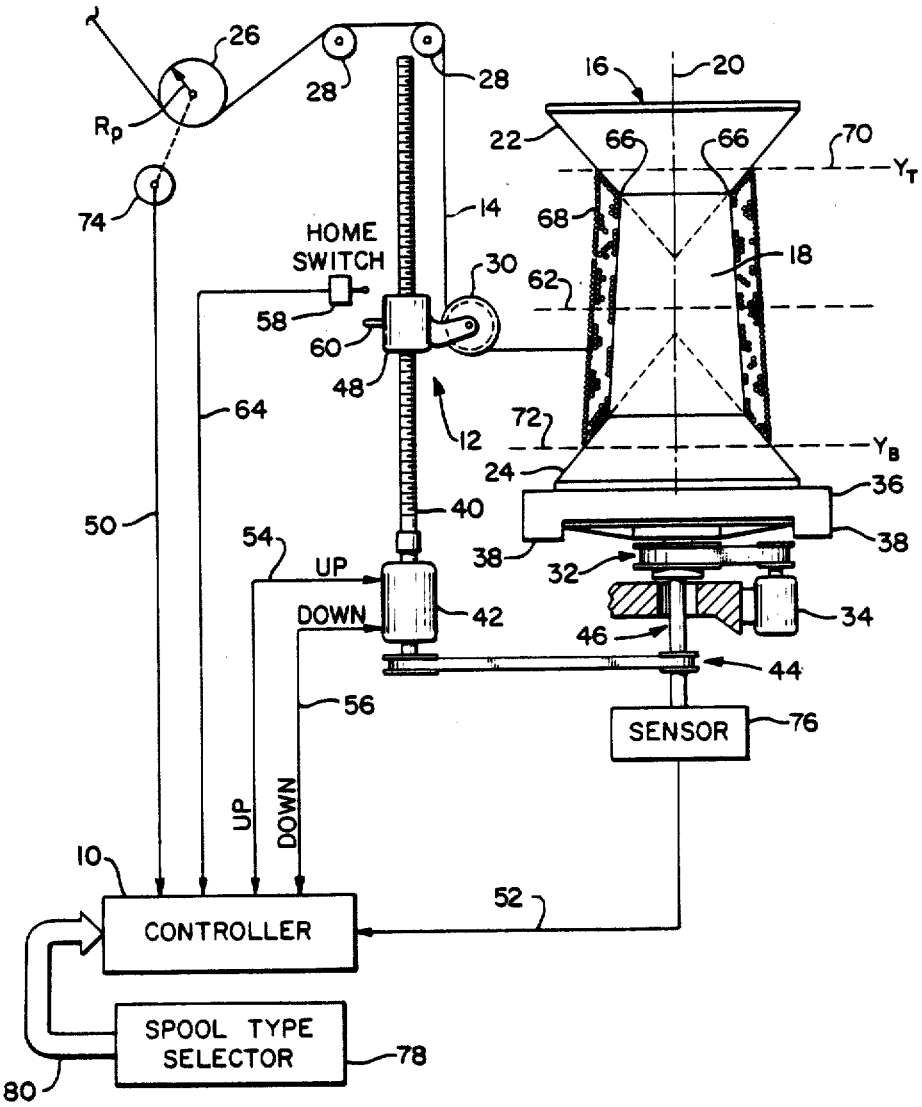
FIG. 1 is an illustration of a controller 10 and associated sensors 74, 76, according to the present invention, for use with a wire spooling apparatus.

FIG. 1 is an illustration of a controller 10, according to the present invention, for controlling the reversal points of a traverse mechanism 12 as it guides a strand 14 of wire or other filamentary material onto a take-up spool 16. The strand is guided onto the barrel 18 of the spool in successive layers. The spool may have straight end flanges (having faces perpendicular to a rotation axis 20) or may have out-turned conic section end flanges in the form of frusta 22, 24. The barrel 18 may be cylindrical or tapered as shown in FIG. 1.

If the end flanges have a straight horizontal shape the determination of the reversal points is a fairly simple matter since they will be the same every time. With an end flange having a frustum shape, as shown in FIG. 1, there is an additional complexity added since each successive layer is wider than the preceding layer and the reversal points become further apart as the depth of the layers on the barrel becomes greater. This particular problem was solved by the invention described in U.S. Pat. No. 4,485,978. However, that particular solution did not address the added complexity of having, instead of a right circular cylinder for a barrel, a tapered barrel, such as is shown in FIG. 1. This adds an additional complexity which the present invention solves for barrels and end flanges of any type. In addition to solving that particular approach, the present invention is general and covers all cases.

As in the disclosure of U.S. Pat. No. 4,485,978, which is hereby expressly incorporated by reference, the strand 10, such as an insulated copper wire withdrawn from wire processing equipment or a supply reel (not shown) is advanced into engagement with a wire feed capstan 26 of radius $R_p$ which either may be driven to advance the strand 14 at a given linear speed or may be rotated by the advancing strand at a speed proportional to a given linear speed of advancement thereof. The strand passes around one or more guide rollers 28 to a wire guide sheave 30 of the traverse mechanism 12. The sheave 30 distributes turns of the strand on the take-up spool 16 which is rotated about its central longitudinal axis 20 by means of a pulley and belt transmission 32 to an electric motor 34 or other suitable motive means.

In one form of the invention wherein the capstan 26 is rotated by the advancing strand 14 at a speed proportional to the speed of strand advancement, the motor 34 may be a conventional adjustable-speed motor which runs at a selected uniform speed to rotate the spool 16 with a substantially constant rotational velocity. In another form of the invention wherein the strand 14 is advanced by the capstan 26 at a generally uniform linear speed, the motor 34 is preferably of the constant-torque type. As is well known, a motor 34 of the latter type rotates the spool 16 with a controlled torque effective to maintain a substantially constant tension in the strand 14 being supplied to the spool 16. Because the strand is being supplied at a controlled rate, the speed of the motor and the rotational velocity of the spool are reduced as build-up of the strand on the spool increases the winding diameter thereof. Although the invention is more particularly described hereinafter in connection with the form employing a strand advancing capstan 26 and a spool rotating motor 34 of the constant-torque type, it will become evident that the invention is equally applicable to the alternate form employing a capstan 26 rotated by the advancing strand 14 and a spool rotating motor 34 of the adjustable speed type.

The spool 16, which may have a cylindrical barrel or a tapered barrel and which may have flat end pieces or tapered end pieces of any selected angularity such as shown in FIG. 1, may include an integral platform 36 with supporting legs 38 to permit transport of the spool with a forklift truck. However, tapered flange spools of other constructions such as those disclosed in U.S. Pat. Nos. 4,140,289 and 4,269,371 may be utilized in connection with the present invention.

The traverse mechanism 12 includes a screw shaft 40 journaled in spaced relation with the spool 16 and driven by the motor 34 at a rotational speed directly related to the rotational speed of the spool 16. The screw shaft 40 is connected to a reversing mechanism 42 which, in turn, is connected by a non-slip belt and pulley arrangement 44 to the main drive shaft 46. Depending on whether it is supplied with a forward (UP) or a reverse (DOWN) electrical signal from the controller 10, the reversing mechanism 42 causes the screw shaft 40 to rotate in either a clockwise or a counterclockwise direction. A carriage 48 which rotatability supports the sheave 30 carries a ball nut threadably engaging the screw shaft 40 for effecting reciprocation of the sheave 30 back and forth lengthwise of the spool 16 to distribute turns of strand 14 along the length of the spool.

In operation of the spooling apparatus shown in FIG. 1, an empty spool 16 is set in place for rotation by the motor 34. With the strand guide sheave 30 in the position at the bottom of the tapered shaft in FIG. 1, the strand 14 to be wound on the spool 16 is passed over the rollers 28 and around the sheave 30. The leading end of the strand is secured to the spool by tying it to a knob (not shown) on the platform or to the spool. Upon actuation of the capstan 26 to advance the strand toward the spool 16, the motor 34 is started and begins rotating the spool and the screw shaft 40. Turns of strand are helically wound upon the barrel 18 as the sheave 30 is advanced upwardly by the rotating screw shaft 40. A first layer of uniformly distributed helical turns of strand will thus be wound upon the spool barrel 18. Upon reaching end flange 22, the reversing mechanism 42 receives a DOWN signal and subsequently causes rotation of the screw shaft 40 in an opposite direction and the sheave 30 is advanced downwardly to wind a second layer of strand over the first layer. Further upward and downward traverses of the sheave 30 results in the build-up of strand 14 on the spool with the formation of superimposed layers of turns.

In accordance with the present invention, if the end flanges are straight horizontal end pieces, the reversal points are the same each time.

On the other hand, in order to distribute the strand 14 in successively wider layers for tapered end flanges, such as is shown in FIG. 1, the limits of reciprocation of the sheave 30 are controlled in accordance with the present invention to automatically increase the extent of movement of the sheave 30 during the wire build-up on the spool. To accomplish this control, means are provided to: (1) provide an advance signal 50 indicative of the advance in time of the advancing strand 14; (2) provide a spool signal 52 indicative of the present rotation rate of the spool 16 having the advancing strand helically wound in successive layers thereon; (3) comparing the magnitudes of the advance signal and the spool signal and determining therefrom the present points of intersection of the spool's end flanges with a line parallel to the surface of the spool's barrel and indicative of the present position of the topmost layer of the strand on the barrel such that the points of intersection correspond to reversal points for the traverse mechanism 12 for guiding the strand repeatedly back and forth from end-to-end of the spool to form the successive helical layers on the barrel; and, (4) providing forward and reverse switching signals to the traverse mechanism 12 corresponding to the present points of intersection with the end flanges.

One means for establishing and determining a reference position is to provide a home switch 58 which may be actuated by an actuator 60 mounted on the carriage 48 and positioned to actuate the home switch as the strand 14 passes through a reference position 62 on the barrel 18 as the carriage moves upwardly. The home switch then provides a reference signal on a line 64 to the controller 10.

Assuming that the sheave 30 is laying down the first layer of strand on the barrel 18, in an upward direction, the helical winding will eventually reach the end flange where it meets the barrel at a point 66. At this point, reversal will take place and a second layer will be built up until the topmost layer reaches end flange 24, at which point another reversal is made to start building up a third layer. Each successive layer becomes slightly wider, for the end flanges of FIG. 1, and the reversal points become further separated as the layers build-up. For example, after several layers have built up the widening width of the topmost layer 68 becomes more apparent, as in FIG. 1, and a reversal will take place at each end of that layer at a top level 70 and a bottom level 72.

According to the present invention, the advance of the strand 14 is measured by a sensor 74 which provides the advance signal on the line 50 to controller 10. This signal is compared, as described above, to the magnitude of the signal on the line 52 from a sensor 76 which may be attached to the drive shaft 46, or which may be a sensor of another type.

An input device 78 provides one or more signals on a line 80 to the controller 10 indicative of the particular spool type selected for winding. This information is stored in the selector device 78 in advance and may include parameters relating to a wide variety of spool types including flat end flanges, tapered end flanges, cylindrical barrels, tapered barrels, or any combination thereof. This prestorage of the various parameters which will be associated with the various types of spools which an operator may wish to wind permits the operator to very quickly enter a code symbol associated with a particular type of spool to be wound. Signals representative of the parameters for that spool are then automatically loaded into the controller and no further adjustments or other input from the operator is required.

Figure 2:
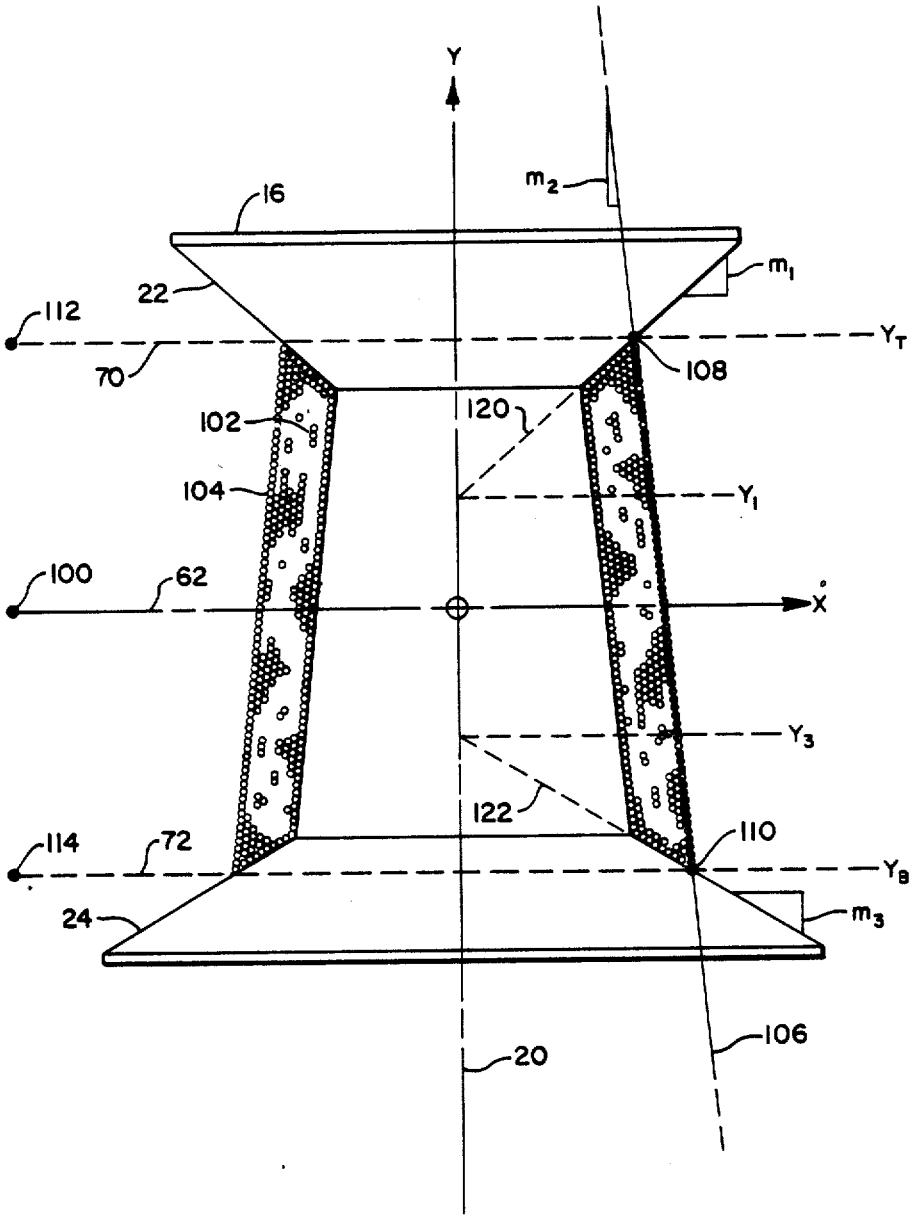
FIG. 2 is an illustration of the principles upon which the present invention is based.

Referring now to FIG. 2, a diagram is presented which illustrates aspects of the principles upon which the present invention is based. There, a spool 16 is shown having a longitudinal axis of rotation 20 corresponding to the y-axis of a Cartesian coordinate system in which the x-axis is selected, for convenience, to be coincident with the reference line 62 of FIG. 1. Thus, a point 100 on line 62 will be referred to hereinafter as a reference point corresponding to the point at which the home switch is actuated. A build-up of several layers 102 of strand 14 is shown in FIG. 2. The topmost layer presently being wound may be described by a line 106 in the x-y plane of the coordinate system. It is coincident with the topmost layer 104 and has a y-intercept which, though not shown in FIG. 2, will ultimately intersect the y-axis at a point extending beyond the boundaries of the figure. The slope of the line 106 is the same as that of the spool's barrel with respect to the axes of the coordinate system. This information can be preloaded into the spool type selector 78 for loading by an operator into the controller 10.

Line 106 has a pair of intersection points 108, 110 with the end flanges 22, 24, respectively. These points of intersection can be determined by solving, simultaneously, the equation for line 106 and equations for a pair of lines lying in the surface of the flanges and in the same plane as the x-y plane of the coordinate system. These points of intersection correspond to a pair of reversal points 112, 114 for the traverse mechanism 12.

The mathematical relationships upon which the principles of the invention are based will be described in detail below.

The reversal points 112, 114 may be determined based on several factors, including the period of the spool 16 when the sheave 30 is at a specific height, the period of the wire speed reference wheel or capstan 26, and the present depth dimension of the layers on the spool barrel. When the traverse mechanism reaches and activates the home switch 58, the wire will be winding onto the spool at a known height 62. At this height, the period of the spool is measured by the controller 10 via the signal 52 provided by sensor 76. Also, the controller 10 measures the time for a specific wire length to pass by the capstan 26 via the wire speed signal 50 provided by sensor 74. The controller uses these two time measurements, along with the known spool geometry, to determine the heights 70, 72 at which the present wire surface 104 intersects the top and bottom flange surfaces 22, 24. These are the heights at which the traverse must reverse its direction of travel. The guide sheave continues to travel upward until it reaches top flange intersection height 70. At that point 112, the traverse is sent down to the bottom flange intersection height 72. The traverse is then sent up to the home switch 58 where the process is repeated. The traverse sheave 30 height at any time is kept track of by the controller 10 by means of the sensor 76, the known drive ratio, and the traverse direction.

The basic equation of a line in an x-y coordinate system is:

$$y = mx + b \tag{1}$$

The equation of a top-right flange line 120 in FIG. 2 is:

$$y = m_1x + Y_1 \tag{2}$$

The equation of the bottom-right flange line 122 is:

$$y = m_3x + Y_3 \tag{3}$$

The equation of the wire surface line 106 is:

$$y = m_2x + B_2 \tag{4}$$

where $B_2$ is equal to the y-intercept, not shown, off the top of the page.

The present radius of the spool, including strand, as measured along the x-axis 62 is:

$$R_{SP} = \left[\frac{P_{SP}}{P_{WP}}\right] \cdot R_{WP}, \tag{5}$$

where, $R_{SP}$=radius of the spool, including wire layers, as measured along the x-axis 62 of FIG. 2, $P_{SP}$=period of spool 16, $P_{WP}$=period of wheel 26, and $R_{WP}$=radius of wheel 26.

The radius of the spool at the reference level ($y_2$) is:

$$R_{SP2} = X_2 = \left[\frac{P_{SP2}}{P_{WP}}\right] \cdot R_{WP}, \tag{6}$$

where, $R_{SP2}$=the radius of the spool at the home switch level, $P_{SP2}$=the period of the spool when wire is winding at the home switch level.

Solving equation (4) for point ($X_2$, $Y_2$):

$$Y_2 = m_2 = \left[\frac{P_{SP2}}{P_{WP}}\right] R_{WP} + B_2 \tag{7}$$

$$B_2 = Y_2 - m_2R_{wp}\left[\frac{P_{SP2}}{P_{WP}}\right] \tag{8}$$

The equation of the wire surface is then (8) (4):

$$y = m_2x + Y_2 - m_2R_{WP}\left[\frac{P_{SP2}}{P_{WP}}\right] \tag{9}$$

The spool radius at the top reversal is at the intersection of equations (9) and (2):

$$m_1X_T + Y_1 = m_2X_T + Y_2 - m_2R_{WP}\left[\frac{P_{SP2}}{P_{WP}}\right] \tag{10}$$

$$X_T(m_1 - m_2) = Y_2 - Y_1 - m_2R_{WP}\left[\frac{P_{SP2}}{P_{WP}}\right]$$

$$X_T = \frac{Y_1 - Y_2}{m_2 - m_1} + \left[\frac{m_2R_{WP}}{m_2 - m_1}\ \frac{P_{SP2}}{P_{WP}}\right]$$

Substitute (10) into (2) to find the reversal height ($Y_T$)

$$Y_T = m_1\left[\frac{Y_1 - Y_2}{m_2 - m_1} + \frac{m_2R_{WP}}{m_2 - m_1} \cdot \frac{P_{SP2}}{P_{WP}}\right] + Y_1 \tag{11}$$

$$Y_T = \frac{m_1(Y_1 - Y_2)}{m_2 - m_1} + \frac{m_1m_2R_{WP}P_{SP2}}{(m_2 - m_1)P_{WP}} + Y_1$$

Similarly the bottom reversal height ($Y_B$) is $$Y_B = \frac{m_3(Y_3 - Y_2)}{m_2 - m_3} + \frac{m_3m_2R_{WP}P_{SP2}}{(m_2 - m_3)P_{WP}} + Y_3 \tag{12}$$

$P_{SP2}$ and $P_W$ are values measured by the controller. $R_{WP}$ and $Y_2$ are fixed values and are known by the controller. The spool dimensions $Y_1$, $Y_3$, $M_1$, $M_2$ and $M_3$ for all spool types are contained in the memory of the controller. The controller uses the spool dimensions in the reversal height calculations for the type of spool that the operator has selected using the spool type selector. Once properly positioned, the home switch need not be adjusted when changing spool types.

Figure 3:
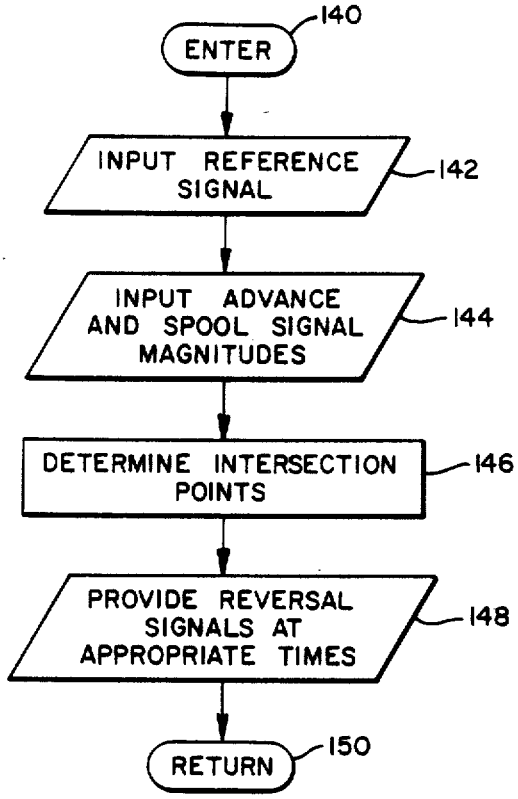
FIG. 3 is a flowchart illustration of logical steps which may be accomplished, according to the present invention, by the signal processor controller of FIG. 4.
Figure 4:
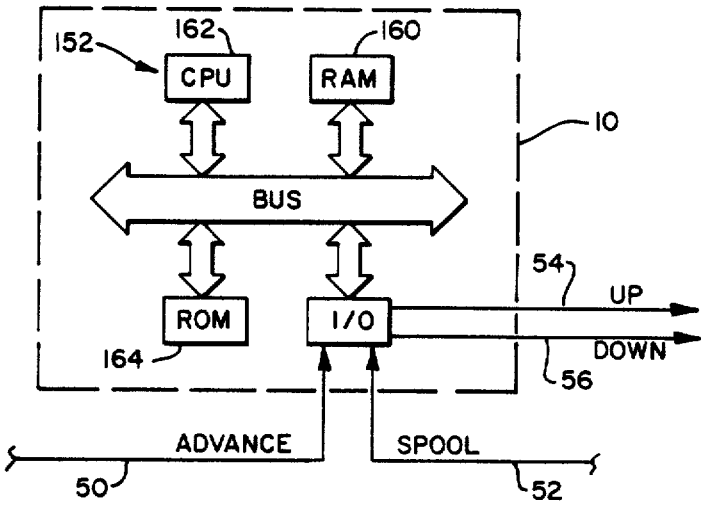
FIG. 4 is an illustration of a signal processor controller, such as the controller illustrated in FIG. 1.

FIG. 3 is an illustration of a series of steps which may be executed by the controller 10 of FIG. 1 as embodied in the signal processor 152 of FIG. 4.

The beginning of the steps, which will be begun each time the home switch 58 is tripped, is indicated in a step 140. This entering step is followed by a step 142 which indicates the actual physical inputting of the reference signal on the line 64 into the controller 10. After step 142 is executed, the advance signal on the line 50 and the spool signal on the line 52 are both input to the controller and their magnitudes are stored in a RAM unit 160 as illustrated in FIG. 4. A CPU 162 may consult a ROM unit 164 to obtain the necessary steps, in accordance with the mathematical formulas described above, to determine the reversal heights $Y_T$ and $Y_B$ corresponding to the points of intersection 108, 110 of FIG. 2 which in turn correspond to the present depth of the layers of strand 14. After the computation is completed in step 146, a step 148 is next executed in which reversal signals on lines 54, 56 are provided at appropriate times in order to effect the correct reversal of the traverse mechanism 12. A step 150 is next executed in which the signal processor returns to any other programs it may be running or waits until the home switch is again actuated on the upward movement of the carriage 48.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

I claim:

1. A method for controlling reversal points of a traverse mechanism for guiding an advancing strand of wire or filamentary material back and forth from end flange-to-end flange of a rotating spool to form a helical winding in successive layers onto the barrel of the spool, comprising the steps of:

sensing the advance in time of the advancing strand and providing an advance signal indicative of the magnitude thereof;

sensing the rotation rate of the spool and providing a spool signal indicative of the magnitude thereof;

determining, from the magnitudes of said advance signal and said spool signal, the position of a line parallel to the surface of the spool's barrel at the level of the topmost layer of the strand on the barrel;

determining the points of intersection of said line with the spool's end flanges, said points of intersection corresponding to the reversal points for the traverse mechanism; and providing a reversal signal to the mechanism upon said topmost layer reaching each point of intersection.

2. The method of claim 1, wherein the spool has at least one tapered end and the layers are successively wider.

3. The method of claim 1, wherein the barrel is tapered.

4. The method of claim 1, wherein said reversal points are referenced to a single reference point.

5. The method of claim 1, wherein the slope of said line, with respect to a Cartesian coordinate system having its y-axis coincident with the axis of rotation of the spool, is predetermined according to the geometry of the barrel and wherein the position of said line, as expressed by a y-intercept, is determined from the magnitude of said spool signal and the magnitude of said advance signal.

6. Apparatus for controlling reversal points of a traverse mechanism for guiding an advancing strand of wire or filamentary material back and forth from end flange-to-end flange of a rotating spool to form a helical winding in successive layers onto the barrel of the spool, comprising:

first sensor means, responsive to the advance in time of the advancing strand for providing an advance signal having a magnitude indicative of said advance in time;

second sensor means, responsive to the rotation rate or periodicity of rotation of the spool, for providing a spool signal having a magnitude indicative of said rotation rate or periodicity of rotation; and signal processing means, responsive to said advance signal and to said spool signal for determining the position of a line parallel to the surface of the barrel at the level of the topmost layer on the barrel, and determining the points of intersection of said line with the spool's ends, said points of intersection corresponding to the reversal points for the traverse mechanism, said signal processing means providing a reversal signal upon said topmost layer reaching each point of intersection.

7. The apparatus of claim 6, wherein the spool has at least one tapered end and the layers are successively wider.

8. The apparatus of claim 6, wherein the spool has a tapered barrel.

9. The apparatus of claim 6, further comprising third sensor means for providing a reference signal indicative of the mechanism guiding the strand past a reference point in a selected one of the directions of traverse of the traverse mechanism, wherein said signal processing means initiates determining said points of intersection for each successive layer upon reception of said reference signal.

10. The apparatus of claim 6, wherein the slope of said line is with respect to a Cartesian coordinate system having its y-axis coincident with the axis of rotation of the spool, wherein the slope is predetermined according to the geometry of the spool's barrel and wherein the level of said line is determined, for successive layers, from the magnitude of said advance signal and the magnitude of said spool signal.

*11. A system for winding filamentary material onto a spool having a barrel said system comprising:*

*means for advancing said filamentary material from a remote location to said spool;*

*means for distributing said filamentary material on said spool;*

*guide means, operatively positioned between said advancing means and said distributing means, for guiding said filamentary material to said distributing means;*

*a take up spool having means for rotating said spool about an axis operatively connected thereto;*

*a take up spool having means for rotating said spool about an axis operatively connected thereto;*

*direction change means, operatively connected to said distributing means, for reversing the direction of said filamentary material in said spool, said direction change means further comprising:*

*first sensor means, response to the advance in time of said advancing filamentary material, for providing a first signal having a magnitude relative to said advance in time;*

*second sensor means, responsive to the rotation rate of said spool, for providing a second signal having a magnitude relative to said rotation rate; and*

*signal processing means, responsive to said first and second signals, for determining the position of a line parallel to a surface of said barrel at the level of the topmost layer on said barrel, and for determining the intersection points of said line with said spool's ends, said points of intersection corresponding to reversal points for said direction change means, said signal processing means providing a third signal to said direction change means upon said topmost layer reaching each point of interaction so that the direction of movement of said distribution means is reversed thereby providing a spool of helically wound and uniformly distributed filamentary material in superimposed successively wider layers on said spool.*

*12. The system of claim 11 wherein said direction change means further comprises:*

*a screw shaft; and*

*a carriage having a pulley operatively connected to said screw shaft for moving between the ends of said screw shaft.*

* * * * *